United States Patent
Yasuda (10) Patent No.: US 11,007,752 B2
(45) Date of Patent: May 18, 2021

(54) FAR INFRARED REFLECTIVE FILM, HEAT SHIELD FILM, AND HEAT SHIELD GLASS

(71) Applicant: FUJIFILM CORPORATION, Tokyo (JP)

(72) Inventor: Hideki Yasuda, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 17/066,483

(22) Filed: Oct. 8, 2020

(65) Prior Publication Data

US 2021/0078290 A1   Mar. 18, 2021

Related U.S. Application Data (63) Continuation of application No. PCT/JP2019/014791, filed on Apr. 3, 2019.

(30) Foreign Application Priority Data

Apr. 12, 2018 (JP) .............................. JP2018-076712

(51) Int. Cl.
*B32B 15/08* (2006.01)
*G02B 5/28* (2006.01)
(Continued)

(52) U.S. Cl.
CPC .......... *B32B 15/08* (2013.01); *B32B 17/1022* (2013.01); *B32B 17/10036* (2013.01);
(Continued)

(58) Field of Classification Search
CPC ..... B32B 17/00–17/1099; B32B 15/00–15/20; G02B 5/281; G02B 5/282; G02B 5/26; C08K 2003/0806
See application file for complete search history.

(56) References Cited

U.S. PATENT DOCUMENTS

2011/0111210 A1* 5/2011 Matsunami ........... C03C 17/008
428/328
2015/0002928 A1   1/2015 Kiyoto et al.
(Continued)

FOREIGN PATENT DOCUMENTS

JP    2012-206430 A   10/2012
JP    2013-205810 A   10/2013
(Continued)

OTHER PUBLICATIONS

Tani et al. "Transparent near-infrared reflector metasurface with randomly dispersed silver nanodisks", Optics Express, vol. 22, No. 8, (2014); pp. 9262-9270.*
(Continued)

*Primary Examiner* — Prashant J Khatri
(74) *Attorney, Agent, or Firm* — Solaris Intellectual Property Group, PLLC (57) ABSTRACT

Provided are a far infrared reflective film including a base material and a far infrared reflective layer including a binder and flat conductive particles, in which a value obtained by dividing an average particle diameter of the flat conductive particles by an average thickness of the flat conductive particles is 20 or more, a thickness y nm of the far infrared reflective layer is 3 times or more the average thickness of the flat conductive particles, a volume fraction x of the flat conductive particles in the far infrared reflective layer is 0.4 or more, and a product x×y of the volume fraction x and the thickness y satisfies Expression A, a heat shield film including the far infrared reflective film, and a heat shield glass including the far infrared reflective film.

$$x \times y \le 0.183 \times \frac{\lambda}{k} \quad \text{Expression A}$$

10 Claims, 2 Drawing Sheets

(51) Int. Cl.
  *B32B 17/10* (2006.01)
  *G02B 5/26* (2006.01)
  *C03C 17/32* (2006.01)
  *G02B 13/14* (2006.01)
  *B32B 13/14* (2006.01)

(52) U.S. Cl.
  CPC ........ *B32B 17/10449* (2013.01); *C03C 17/32* (2013.01); *G02B 5/26* (2013.01); *G02B 5/282* (2013.01); *G02B 13/14* (2013.01); *B32B 2307/304* (2013.01); *B32B 2307/416* (2013.01)

(56) References Cited

U.S. PATENT DOCUMENTS

2016/0290036 A1* 10/2016 Nukui .................. C08F 220/22
2018/0141118 A1   5/2018 Machida et al.

FOREIGN PATENT DOCUMENTS

| | | |
|---|---|---|
| JP | 2014-056205 A | 3/2014 |
| JP | 2015-051608 A | 3/2015 |
| JP | 2016-221944 A | 12/2016 |
| JP | 2016221944 A * | 12/2016 |
| JP | 2017-128046 A | 7/2017 |
| WO | 2012/157655 A1 | 11/2012 |
| WO | 2018/180221 A1 | 10/2018 |
| WO | 2019/058833 A1 | 3/2019 |

OTHER PUBLICATIONS

Machine translation of JP2016-221944. Retrieved Jan. 26, 2021.*
International Search Report issued in International Application No. PCT/JP2019/014791 dated Jul. 2, 2019.
Opinion of the ISA issued in International Application No. PCT/JP2019/014791 dated Jul. 2, 2019.

* cited by examiner

FAR INFRARED REFLECTIVE FILM, HEAT SHIELD FILM, AND HEAT SHIELD GLASS

CROSS-REFERENCE TO RELATED APPLICATIONS

This application is a continuation application of International Application No. PCT/JP2019/014791, filed Apr. 3, 2019, the disclosure of which is incorporated herein by reference in its entirety. Further, this application claims priority from Japanese Patent Application No. 2018-076712, filed Apr. 12, 2018, the disclosure of which is incorporated herein by reference in its entirety.

BACKGROUND OF THE INVENTION

1. Field of the Invention

The present disclosure relates to a far infrared reflective film, a heat shield film, and a heat shield glass.

2. Description of the Related Art

In recent years, a far infrared reflective film has been used in applications such as a heat shield film and a heat shield glass.

For example, JP2012-206430A discloses a laminated film in which a metal layer, a carbon layer, and a hard coat layer are sequentially formed on one surface of a base material made of a synthetic resin, and a UV-cutting layer is formed on the other surface of the base material.

In addition, JP2014-056205A discloses a far infrared shielding material including a metal particle-containing layer which contains at least one kind of metal particle, in which the metal particle contains 60% by number or more of hexagonal or circular flat plate metal particles, and a ratio (B/A) of a maximum reflectance B (%) in an infrared region having a wavelength of 3 μm or more to a reflectance A (%) of the far infrared shielding material at a wavelength of 550 nm is 3 or more.

SUMMARY OF THE INVENTION

The present inventor has found that the laminated film disclosed in JP2012-206430A has low radio wave transmittivity although a film that transmits visible light and reflects far infrared rays can obtained.

In addition, the present inventor has found that the far infrared shielding material disclosed in JP2014-056205A has favorable radio wave transmittivity, but has a narrow wavelength range of far infrared rays to be shielded, and there is room for further improvement in reflection performance of the far infrared rays.

An object of an embodiment of the present disclosure is to provide a far infrared reflective film that is capable of reflecting far infrared rays in a wide wavelength range and has excellent visible light transmittivity and excellent radio wave transmittivity, a heat shield film comprising the far infrared reflective film, and a heat shield glass comprising the far infrared reflective film.

Means for solving the above problems include the following aspects.

<1> A far infrared reflective film comprising: a base material; and a far infrared reflective layer including a binder and flat conductive particles, in which a value obtained by dividing an average particle diameter of the flat conductive particles by an average thickness of the flat conductive particles is 20 or more, a thickness y nm of the far infrared reflective layer is 3 times or more the average thickness of the flat conductive particles, a volume fraction x of the flat conductive particles in the far infrared reflective layer is 0.4 or more, and a product x×y of the volume fraction x and the thickness y satisfies Expression A.

$$x \times y \le 0.183 \times \frac{\lambda}{k} \qquad \text{Expression A}$$

In Expression A, λ is 550 nm, and k represents an extinction coefficient of a material constituting the flat conductive particles at a wavelength of 550 nm.

<2> The far infrared reflective film according to <1>, in which the flat conductive particle is a flat metal particle.
<3> The far infrared reflective film according to <2>, in which the flat metal particle includes at least silver.
<4> The far infrared reflective film according to any one of <1> to <3>, in which a principal plane of the flat conductive particle has a hexagonal or more polygonal shape or a circular shape.
<5> The far infrared reflective film according to any one of <1> to <4>, in which a principal plane of the flat conductive particle is planarly oriented in a range of 0° to 30° with respect to a surface of the base material.
<6> The far infrared reflective film according to any one of <1> to <5>, in which the flat conductive particles are randomly arranged in a surface direction of the far infrared reflective layer.
<7> The far infrared reflective film according to any one of <1> to <6>, in which the binder includes a polymer.
<8> The far infrared reflective film according to any one of <1> to <7>, in which the far infrared reflective film is used for a heat shield material.
<9> A heat shield film comprising: the far infrared reflective film according to any one of <1> to <8>.
<10> A heat shield glass comprising: the far infrared reflective film according to any one of <1> to <8>.

According to the embodiment of the present disclosure, a far infrared reflective film that is capable of reflecting far infrared rays in a wide wavelength range and has excellent visible light transmittivity and excellent radio wave transmittivity, a heat shield film comprising the far infrared reflective film, and a heat shield glass comprising the far infrared reflective film are provided.

DESCRIPTION OF THE PREFERRED EMBODIMENTS

Details of the present disclosure will be described below. The description of the constituent elements which will be described below may be made based on the representative embodiment of the present disclosure, but the present disclosure is not limited to such an embodiment.

Although the description will be made with reference to the accompanying drawings, the reference numerals may be omitted. The constituent elements indicated by the same reference numerals in the drawings mean the same constituent elements.

In the present disclosure, the numerical range represented by "to" means a range including the numerical values before and after "to" as the lower limit and the upper limit.

In the numerical ranges described stepwise in the present disclosure, the upper limit or the lower limit described in one numerical range may be replaced with the upper limit or the lower limit of the numerical range of another stepwise described numerical range. In addition, in the numerical range described in the present disclosure, the upper limit or the lower limit of the numerical range may be replaced with the value shown in Examples.

In the present disclosure, the term "process" as used herein refers not only to an independent process but also to a process that cannot be clearly distinguished from other processes as long as an intended purpose of the process is achieved.

In the present disclosure, in a case where a plurality of substances corresponding to each component are present in a layer such as an infrared absorbing layer, unless otherwise specified, the amount of each component in the layer means the total amount of the plurality of substances present in the layer.

In the present disclosure, unless otherwise specified, a molecular weight of a polymer component is a weight-average molecular weight (Mw) or a number-average molecular weight (Mn) in terms of polystyrene measured by gel permeation chromatography (GPC) using tetrahydrofuran (THF) as a solvent.

In the present disclosure, "far infrared rays" refers to infrared rays having a wavelength of 2.5 μm to 25 μm.

In the present disclosure, combination of preferable aspects is a more preferable aspect.

(Far Infrared Reflective Film)

A far infrared reflective film according to the present disclosure includes a base material and a far infrared reflective layer including a binder and flat conductive particles, in which a value obtained by dividing an average particle diameter of the flat conductive particles by an average thickness of the flat conductive particles is 20 or more, a thickness y nm of the far infrared reflective layer is 3 times or more the average thickness of the flat conductive particles, a volume fraction x of the flat conductive particles in the far infrared reflective layer is 0.4 or more, and a product x×y of the volume fraction x and the thickness y satisfies Expression A.

$$x \times y \leq 0.183 \times \frac{\lambda}{k}$$ Expression A

In Expression A, λ is 550 nm, and k represents an extinction coefficient of a material constituting the flat conductive particles at a wavelength of 550 nm.

As described above, the laminated film disclosed in JP2012-206430A has a problem of low radio wave transmittivity since a metal thin film (metal layer) is used as a far infrared reflective layer.

In addition, since the far infrared shielding material disclosed in JP2014-056205A has excellent wavelength selectivity and has a narrow wavelength range of reflected far infrared rays, it may be desired to shield far infrared rays in a wider wavelength range depending on the application, for example, in a case of being used as a heat shield material.

Therefore, the present inventor conducted intensive study, and found that the far infrared reflective film according to the present disclosure is capable of reflecting far infrared rays in a wide wavelength range and has excellent visible light transmittivity and excellent radio wave transmittivity.

In the far infrared reflective film according to the present disclosure, the reason why a far infrared reflective film capable of reflecting far infrared rays in a wide wavelength range can be obtained is supposed as follows.

The far infrared shielding material disclosed in JP2014-056205A is configured to reflect infrared rays having a specific wavelength by using plasmon resonance of a metal particle.

However, it is known that plasmon resonance causes infrared rays in a relatively narrow wavelength range to be reflected. As described above, in a case where the wavelength range of reflection is narrow, a wide blackbody radiation spectrum cannot be covered, and the performance may be lowered for the purpose of a heat insulating structure.

The far infrared reflective film according to the present disclosure has a value (hereinafter, also referred to as an "aspect ratio") obtained by dividing an average particle diameter of included flat conductive particles by an average thickness of 20 or more, so that the reflection by plasmon resonance in a far infrared region is exhibited.

Since a thickness y of the far infrared reflective layer is 3 times or more the average thickness of the flat conductive particles, and a volume fraction x of the flat conductive particles in the far infrared reflective layer is 0.4 or more, the flat conductive particles overlap with each other in a direction perpendicular to a plane direction of the far infrared reflective layer (a depth direction of the far infrared reflective layer). It is considered that the overlapping makes it possible to obtain a far infrared reflective film having band-widened plasmon resonance and radio wave transmittivity. It is supposed that the reason for the band-widening of plasmon resonance is that the polarization of the particles is enhanced by a near-field interaction between upper and lower particles.

In addition, it is considered that, in a case where x×y satisfies Expression A, the obtained far infrared reflective film also has excellent visible light transmittivity. The reason will be described later.

The far infrared reflective film according to the present disclosure can be formed as a far infrared reflective film having a wavelength selective absorption property with an extremely simple configuration having one far infrared reflective layer, and thus is excellent in productivity.

<Far Infrared Reflective Layer>

The far infrared reflective film according to the present disclosure includes a far infrared reflective layer including a binder and flat conductive particles.

[Flat Conductive Particles]

The far infrared reflective layer in the present disclosure contains flat conductive particles.

In the present disclosure, the terms "conductive" means that a volume resistivity at 20° C. is less than $1 \times 10^4$ Ω·cm, and the volume resistivity is preferably less than $1 \times 10^2$ Ω·cm, and more preferably less than $1 \times 10^0$ Ω·cm.

It is considered that since the flat conductive particles have a large number of free electrons, the distribution of free electrons is likely to be highly deviated by the incident electric field, and the polarization is likely to be larger than that in a case where non-conductive particles are used, resulting in excellent reflectance of far infrared rays.

The volume resistivity is measured with a commercially available resistivity measuring device (for example, Loresta GX MCP-T700 manufactured by Nittoseiko Analytech Co., Ltd.).

—Shape—

The flat conductive particles are particles comprising two principal planes facing each other. A shape of the principal plane of the flat conductive particles is not particularly limited, and examples thereof include an octagonal shape, a hexagonal shape, a triangular shape, and a circular shape. Among these, the shape of the principal plane of the flat conductive particles is preferably a hexagonal or more polygonal shape or a circular shape from a viewpoint of increasing a reflectance of infrared rays.

In the flat conductive particles according to the present disclosure, the principal plane having a circular shape means that the number of sides having a length of 50% or more of an average equivalent circle diameter of the flat conductive particles is 0 per flat conductive particle. The flat conductive particles having a circular principal plane are not particularly limited as long as the flat conductive particles have no corners and have a round shape in a case where the principal plane thereof is observed from above using a transmission electron microscope (TEM).

In the flat conductive particles according to the present disclosure, the principal plane having a hexagonal shape means that the number of sides having a length of 20% or more of an average equivalent circle diameter of the flat conductive particles is 6 per flat conductive particle. The same applies to other polygonal shapes.

The flat conductive particles having a hexagonal principal plane are not particularly limited as long as the flat conductive particles have a hexagonal shape in a case where the principal plane thereof is observed from above using a transmission electron microscope (TEM), and can be appropriately selected depending on the purpose. For example, angles of such a hexagon may be an acute angle or an obtuse angle, but preferably have at least one obtuse angle and more preferably all six angles are obtuse angles, in order to reduce absorption in visible light range. The obtuse angle is not particularly limited and can be appropriately selected depending on the purpose.

In addition, the angles of such a hexagon may be obtuse. The fact that the angle is obtuse means a state in which the angle is not formed by two straight lines but the apex of the angle is rounded. A degree of obtuseness of the angle is not particularly limited and can be appropriately selected depending on the purpose.

—Average Particle Diameter (Average Equivalent Circle Diameter)—

An equivalent circle diameter is represented by a diameter of a circle having an area equal to a projected area of each particle. The projected area of each particle can be obtained by a known method in which the area on an electron micrograph is measured and corrected by an imaging magnification. An average particle diameter (average equivalent circle diameter) is obtained by obtaining the particle diameter distribution (particle size distribution) of an equivalent circle diameter D of 200 flat conductive particles and calculating an arithmetic average. The equivalent circle diameter D is, for example, as indicated by reference numeral D in FIGS. 1 and 2.

The average particle diameter is not particularly limited, but is preferably 50 nm to 2,000 nm, more preferably 70 nm to 1,500 nm, and still more preferably 100 nm to 1,000 nm.

—Average Thickness and Aspect Ratio—

An average thickness of the flat conductive particles is preferably 50 nm or less, more preferably 2 nm to 25 nm, and particularly preferably 4 nm to 15 nm.

Figure 1:
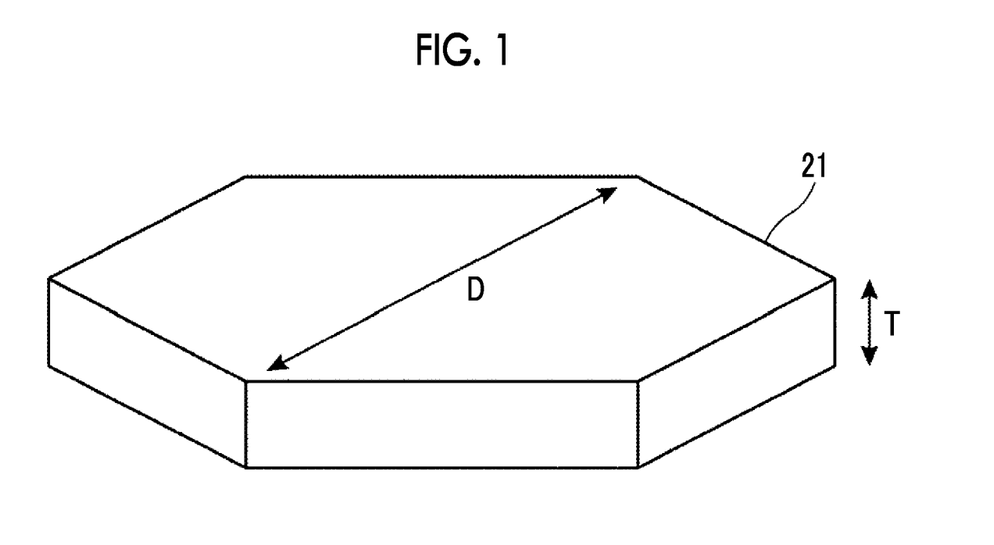
FIG. 1 is a schematic view showing an example of a flat conductive particle.
Figure 2:
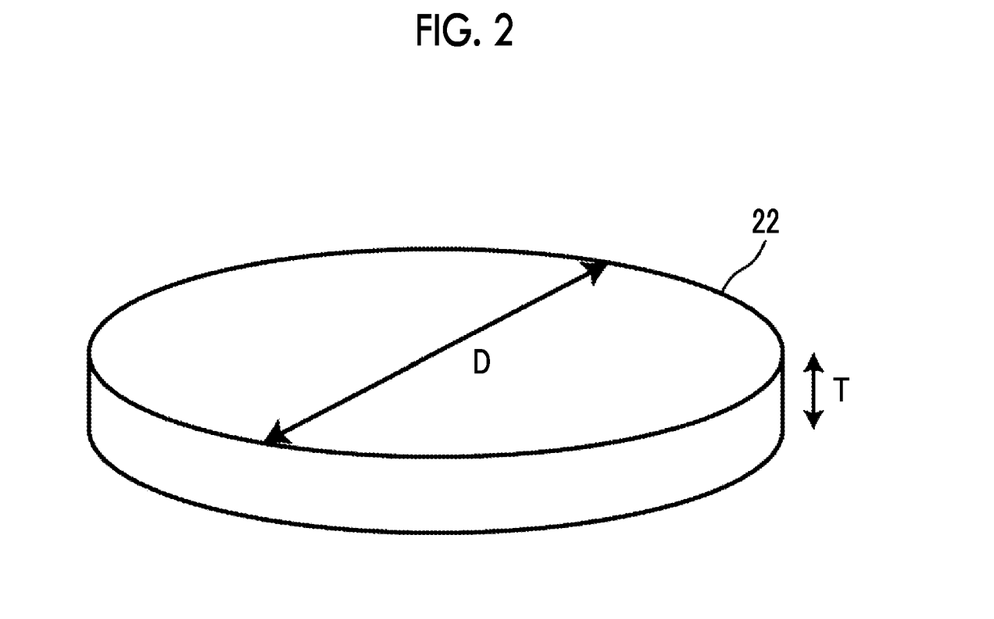
FIG. 2 is a schematic view showing another example of the flat conductive particle.

A particle thickness T corresponds to a distance between the principal planes of the flat conductive particles, and is, for example, as indicated by reference numeral T in FIGS. 1 and 2. The particle thickness T can be measured by a transmission electron microscope (TEM).

A method of measuring the particle thickness T by TEM includes a method in which a film including flat conductive particles is subjected to a coating treatment by carbon vapor deposition or metal vapor deposition, a cross-sectional piece is prepared by focused ion beam (FIB) processing, and the cross section is observed by TEM to measure a particle thickness. The average thickness of the flat conductive particles can be obtained by calculating an arithmetic average of the particle thickness T of 200 flat conductive particles.

A value $D_x/T_x$ obtained by dividing an average particle diameter $D_x$ of the flat conductive particles by an average thickness $T_x$ is not particularly limited as long as the value is 20 or more, and can be appropriately selected depending on the purpose. In the present disclosure, the value of $D_x/T_x$ is referred to as an "aspect ratio". The aspect ratio is preferably 20 to 100 and more preferably 20 to 60, from a viewpoint of a reflectance of far infrared rays.

In a case where the aspect ratio is 20 or more, the reflectivity of far infrared rays is excellent, and in a case where the aspect ratio is 100 or less, the scattering loss of incidence ray can be suppressed.

A ratio of a maximum length to a minimum length in the principal plane in a case where the particles are observed from above is not particularly limited, and can be appropriately selected depending on the purpose, but from a viewpoint of suppressing the anisotropy of a refractive index, the ratio is preferably 10 or less.

—Planar Orientation—

In the far infrared reflective layer used in the present disclosure, the principal plane of the flat conductive particles is preferably planarly oriented in a range of 0° to 30° with respect to the surface of the base material.

Hereinafter, description will be made with reference to FIG. 3.

Figure 3:
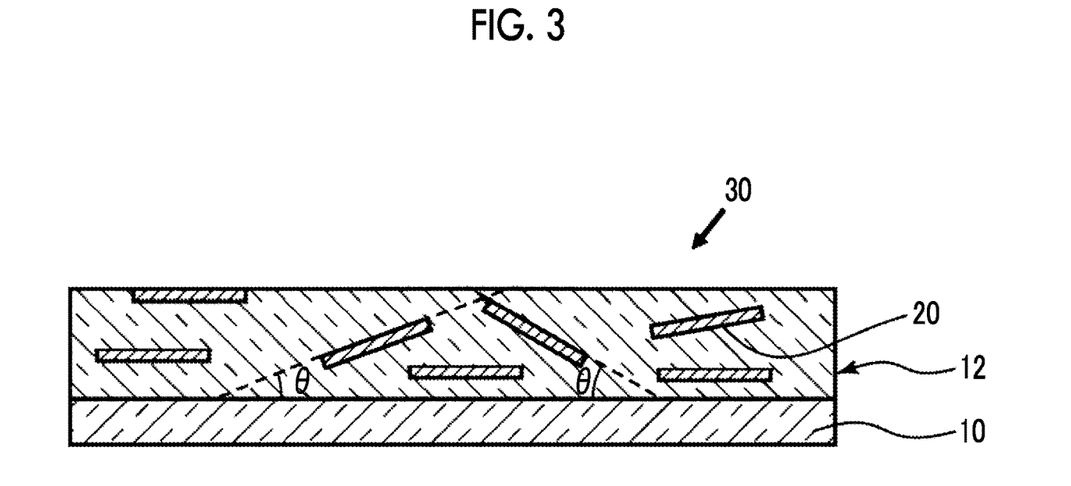
FIG. 3 is a schematic cross-sectional view showing an example of a far infrared reflective layer 12 including a flat conductive particle 20.

FIG. 3 is a schematic cross-sectional view showing an example of the far infrared reflective layer 12 including the flat conductive particles 20 in the far infrared reflective layer according to the present disclosure. A far infrared reflective film 30 in FIG. 3 has the far infrared reflective layer 12 and a base material 10. Hereinafter, an angle θ formed by the base material 10 and the principal plane of the flat conductive particles 20 (the surface that determines the equivalent circle diameter D) will be described with reference to FIG. 3.

In FIG. 3, an angle (an absolute value of an angle θ) formed by the surface of the far infrared reflective layer 12 (interface with the base material 10) and the principal plane (the surface that determines the equivalent circle diameter D) of the flat conductive particles 20 or an extension of the principal plane is 0° to 30°. The angle θ is the smaller of the angles formed by the surface of the far infrared reflective layer 12 and the principal plane (the surface that determines the equivalent circle diameter D) of the flat conductive particles 20 or the extension of the principal plane.

In the present disclosure, the planar orientation of the principal plane of the flat conductive particles in a range of 0° to 30° with respect to the surface of the base material means that an arithmetic average value of the absolute value of θ measured on any 100 particles is 0° to 30°. The arithmetic average value is also referred to as a "degree of planar orientation".

The absolute value of θ is measured by a method in which a cross-sectional piece of the far infrared reflective layer is prepared, and the far infrared reflective layer and the flat conductive particles in this piece are observed and evaluated.

Specifically, a method in which a cross-sectional piece sample of a far infrared reflective layer is prepared using a focused ion beam (FIB) and the sample is evaluated from an image obtained by observing the sample by using a transmission electron microscope (TEM) is mentioned.

A method of observing the cross-sectional piece sample prepared as described above is not particularly limited as long as it can be confirmed whether or not the principal plane of the flat conductive particles is planarly oriented with respect to the surface of the base material in the sample, and for example, a method using TEM or the like can be mentioned. The cross-sectional piece sample may be observed by TEM.

The principal plane of the flat conductive particles is planarly oriented in a range of 0° to 30°, preferably in a range of 0° to 20°, and more preferably in a range of 0° to 10° with respect to the surface of the base material. In a case where the cross section of the far infrared reflective layer is observed, the flat conductive particles 20 are more preferably oriented in a state in which the angle (±θ) shown in FIG. 3 is small. In a case where θ is 30° or less, the magnitude of polarization generated in the flat conductive particles increases, and a high reflectance is easily obtained.

—Material—

A material of the flat conductive particles is not particularly limited and can be appropriately selected depending on the purpose.

The flat conductive particles are preferably flat metal particles from a viewpoint of low absorbance to infrared rays. A metal in the flat metal particles is preferably silver, gold, aluminum, copper, rhodium, nickel, platinum, titanium, or an alloy thereof, and more preferably contains at least silver.

From a viewpoint of visible light transmittivity, the flat conductive particles are also preferably flat transparent conductive particles. Examples of a material of the flat transparent conductive particles include metal oxides such as tin oxide, indium tin oxide (ITO), and indium zinc oxide, organic substances such as polyaniline, polythiophene, polypyrrole, or derivatives thereof, or carbon materials such as graphene.

The term "transparent" in the flat transparent conductive particles means that an average transmittance in a range of 400 nm to 700 nm is 20% or more, preferably 30% or more, and more preferably 50% or more. An upper limit of the transmittance is not particularly limited and needs only be 100% or less. The transmittance is measured using a Fourier transform infrared spectrophotometer (FTIR) or a spectrophotometer.

—Content of Flat Conductive Particles—

In the present disclosure, the flat conductive particles may be used alone or in combination of two or more.

A volume fraction (volume fraction x) of the flat conductive particles in the far infrared reflective layer is 0.4 (40% by volume) or more, and from a viewpoint of increasing a reflectance of far infrared rays, the volume fraction is preferably 0.45 or more, more preferably 0.5 or more, and still more preferably 0.55 or more.

An upper limit of the volume fraction is preferably 0.9 or less and more preferably 0.8 or less from a viewpoint of visible light transmittivity and radio wave transmittivity.

The volume fraction of the flat conductive particles in the far infrared reflective layer can be evaluated by, for example, preparing an appropriate cross-sectional piece and observing an existence proportion of the flat conductive particles in this piece. The method of observing the cross-sectional piece is the same as the method of observing the cross-sectional piece in a case of measuring the absolute value of θ in the planar orientation described above. The observation is performed at a room temperature (23° C.).

—Laminated State of Flat Conductive Particles—

The flat conductive particles are preferably laminated in two or more layers in the far infrared reflective layer, and more preferably in three or more layers. An upper limit is not particularly limited, but it is preferably 50 layers or less.

Here, the lamination of two or more layers can be confirmed by preparing a cross-sectional piece and observing a laminated state of the flat conductive particles in this piece. Specifically, in a case of preparing a cross-sectional piece sample of the far infrared reflective layer by using a focused ion beam (FIB) or the like and observing the sample by using various microscopes (for example, TEM or the like), in a case where 100 lines are drawn in a direction perpendicular to the film surface at intervals of the average particle diameter and 75 or more lines cross two or more flat conductive particles, it is defined that the flat conductive particles are laminated in two or more layers.

Similarly, in a case where 75 or more lines cross three or more flat conductive particles, it is defined that the flat conductive particles are laminated in three or more layers. Hereinafter, the same applies to four layers or more.

—Arrangement State of Flat Conductive Particles—

The flat conductive particles are preferably randomly arranged in a surface direction of the far infrared reflective layer.

The fact that the flat conductive particles are randomly arranged in the surface direction of the far infrared reflective layer means that particle coordinates in a direction horizontal to the surface of the far infrared reflective layer are random. Here, the term "random" means that no significant maximum point other than the origin is generated in a power spectrum of a spatial frequency obtained by performing Fourier transformation on the particle coordinates in the horizontal direction with the far infrared reflective layer. Here, it is assumed that a peak of a spatial frequency 1/R (R indicates an average particle diameter) generated due to the displacement of particles is not regarded as the maximum point.

Specifically, in a case of preparing a cross-sectional sample or a cross-sectional piece sample of the far infrared reflective layer by using a focused ion beam (FIB) or the like and observing the sample by using various microscopes (transmission electron microscope (TEM) or the like), center coordinates of 100 flat conductive particles in the surface direction of the far infrared reflective layer and the direction horizontal to the above direction are obtained, and the randomness can be evaluated from the power spectrum of the spatial frequency obtained by Fourier transformation of the coordinates.

—Plasmon Resonance—

The flat conductive particles preferably exhibit localized surface plasmon resonance, and preferably have a plasmon resonance wavelength in a wavelength range of 2.5 µm to 25 µm.

The plasmon resonance wavelength of the flat conductive particles can be adjusted by a material of the flat conductive particles and a refractive index of a binder described later.

The plasmon resonance wavelength is measured by measuring a spectral reflectance using a Fourier transform infrared spectrophotometer (FTIR) or a spectrophotometer and calculating the maximum point of the spectral reflectance. It is preferable to use a Fourier transform infrared spectrophotometer in a case where the plasmon resonance wavelength is 2.5 µm to 25.0 µm.

A half-width at half maximum of a peak of the spectral reflectance at the plasmon resonance wavelength is preferably 5 µm or more and more preferably 10 µm or more.

The half-width is measured by measuring a spectral reflectance using a Fourier transform infrared spectrophotometer (FTIR) or a spectrophotometer and calculating the full width at half maximum.

—Method of Manufacturing Flat Conductive Particles—

A method of manufacturing the flat conductive particles is not particularly limited, and can be appropriately selected depending on the purpose. For example, a liquid phase method such as a chemical reduction method, a photochemical reduction method, and an electrochemical reduction method is provided as a method of synthesizing flat conductive particles (particularly, flat conductive particles having a hexagonal or more polygonal shape or a circular shape). Among these, a liquid phase method such as a chemical reduction method and a photochemical reduction method is particularly preferable in view of shape and size controllability. Flat conductive particles having a hexagonal or more polygonal shape or a circular shape may be obtained by making the angles of the hexagonal to triangular flat conductive particles obtuse by subjecting the hexagonal to triangular flat conductive particles to, for example, an etching treatment or an aging treatment by heating after synthesizing the hexagonal to triangular flat conductive particles.

As another method of manufacturing the flat conductive particles, a seed crystal is preliminarily fixed on a surface of a base material described later, and then conductive particles (for example, Ag) may be crystal-grown in a flat shape.

In the far infrared reflective layer in the present disclosure, the flat conductive particles may be subjected to a further treatment in order to impart desired properties. Examples of the further treatment include formation of a high refractive index shell layer, and addition of various additives such as a dispersant and an antioxidant.

[Binder]

The far infrared reflective layer in the present disclosure includes a binder.

The binder is not particularly limited, but is preferably a material capable of holding the flat conductive particles in a dispersed state. From a viewpoint of productivity, a material capable of forming a film in a liquid phase is preferable.

The binder in the far infrared reflective layer preferably includes a polymer, rubber, or an inorganic substance formed by a sol-gel method, and preferably includes a polymer.

Examples of the preferable polymer include polymers such as a polyolefin resin, a cyclic polyolefin resin, a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and a natural polymer such as gelatin and cellulose.

Among these, the main polymer is preferably a polyolefin resin or a cyclic polyolefin resin from a viewpoint of transparency to infrared rays.

As the polymer, commercially available products can be preferably used, and examples thereof include ARROWBASE which is a modified polyolefin resin manufactured by Unitika Ltd., CHEMIPEARL which is a polyolefin aqueous dispersion manufactured by Mitsui Chemical Inc., HARDLEN which is a modified polyolefin resin manufactured by Toyobo Co., Ltd., and HITECH manufactured by Toho Chemical Industry Co., Ltd.

In the present disclosure, the main polymer refers to a polymer component that accounts for 50% by mass or more of the polymer included in the far infrared reflective layer.

As the rubber, well-known rubber can be used, but it is preferable to use nitrile rubber, ethylene propylene rubber, and butyl rubber from a viewpoint of transmittivity to infrared rays.

As the inorganic substance formed by the sol-gel method, well-known materials can be used. Examples of such materials include oxides such as silica and titanium oxide, and fluorides such as magnesium fluoride.

The binder in the present disclosure is preferably transparent to infrared rays. In the present disclosure, the term "transparent to infrared rays" means that an average transmittance in a wavelength range of 2.5 µm to 25 µm is 20% or more, preferably 30% or more, and more preferably 50% or more. An upper limit of the transmittance is not particularly limited and needs only be 100% or less. The transmittance is obtained as an arithmetic average value of values measured by using a spectral reflectance with a Fourier transform infrared spectrophotometer (FTIR) at 100 nm intervals in a wavelength range of 2.5 µm to 25 µm.

Further, the binder in the present disclosure is preferably transparent to visible light. In the present disclosure, the term "transparent to visible light" means that an average transmittance in a range of 400 nm to 700 nm is 20% or more, preferably 30% or more, and more preferably 50% or more. An upper limit of the average transmittance is not particularly limited and needs only be 100% or less. The average transmittance is measured using a spectral reflectance using a spectrophotometer.

—Refractive Index—

A refractive index of the binder used in the present disclosure is preferably 1.3 or more, more preferably 1.4 or more, and still more preferably 1.5 or more.

In a case where the refractive index of the binder is within the above range, an infrared reflectance of the far infrared reflective layer can be further increased.

The refractive index of the binder is calculated based on a multiple reflection theory and a Fresnel interference theory by measuring a spectral reflectance and a spectral transmittance using a Fourier transform infrared spectrophotometer (FTIR).

—Content—

The far infrared reflective layer in the present disclosure preferably contains the binder preferably in an amount of 10% by volume to 60% by volume, more preferably in an amount of 15% by volume to 60% by volume, and still more preferably in an amount of 25% by volume to 60% by volume, based on the total volume of the far infrared reflective layer.

The content of the binder is calculated by the same method as the content of the flat conductive particles described above.

[Other Components]

The far infrared reflective layer in the present disclosure may contain other components in addition to the flat conductive particles and the binder. Examples of the other component include air and known additives.

[Thickness]

A thickness (film thickness, y nm) of the far infrared reflective layer is 3 times or more the average thickness of the flat conductive particles, and from a viewpoint of a reflectance of infrared rays, the thickness is preferably 4 times to 20 times and more preferably 5 times to 10 times.

The thickness of the far infrared reflective layer is preferably 10 nm to 100 nm and more preferably 20 nm to 70 nm, from a viewpoint of visible light transmittivity and radio wave transmittivity.

[Product x×y of Volume Fraction x and Thickness y]

A product x×y of the volume fraction x and the thickness y satisfies Expression A.

$$x \times y \leq 0.183 \times \lambda/k \quad \text{Expression A}$$

In Expression A, λ is 550 nm, and k represents an extinction coefficient of a material constituting the flat conductive particles at a wavelength of 550 nm.

In the present disclosure, the extinction coefficient is a value obtained by analyzing a constituent material of the flat conductive particles by X-ray fluorescence analysis (XRF) or the like, forming a 100 nm thin film having the same composition, measuring an absorption coefficient by ellipsometry or the like, and calculating an extinction coefficient from the absorption coefficient.

For example, in a case where the flat conductive particles are silver particles, k is 3.32.

The far infrared reflective layer according to the present disclosure includes a binder and flat conductive particles. Visible light transmittance of such a so-called composite material is not obvious. The present inventor has studied and found that the transmittance of the far infrared reflective layer correlates with the total amount of a conductive material constituting the flat conductive particles included in the far infrared reflective layer.

The product x×y of the volume fraction x of the flat conductive particles in the far infrared reflective layer and the thickness y (nm) of the far infrared reflective layer corresponds to the total amount (thickness) of the conductive material. A transmittance τ of light transmitted through the conductive material whose total amount is x×y is represented by Expression T according to Beer's law. Here, λ=550 nm, and k represents an extinction coefficient at 550 nm of a material constituting the flat conductive particles.

That is, in a case where the transmittance T is 10% or more, Expression A is satisfied.

$$\tau = e^{-x \times y \times 4 \times \pi \times k/\lambda} \quad \text{Expression T}$$

The product x×y of the volume fraction x and the thickness y preferably satisfies Expression B, and more preferably satisfies Expression C.

$$x \times y \leq 0.151 \times \frac{\lambda}{k} \quad \text{Expression B}$$

$$x \times y \leq 0.128 \times \frac{\lambda}{k} \quad \text{Expression C}$$

In Expression B or Expression C, λ is 550 nm, and k represents an extinction coefficient of a material constituting the flat conductive particles at a wavelength of 550 nm.

[Refractive Index]

A refractive index of the far infrared reflective layer has a refractive index with respect to infrared rays having a wavelength of 2.5 μm to 25 μm is preferably 3.0 or more, more preferably 5.0 or more, and still more preferably 7.0 or more.

An upper limit of the refractive index is not particularly limited, and for example, the upper limit is preferably 50 or less and more preferably 30 or less.

The refractive index is calculated based on a multiple reflection theory and a Fresnel interference theory by measuring a spectral reflectance and a spectral transmittance using a Fourier transform infrared spectrophotometer (FTIR). The refractive index is obtained as an arithmetic average value of results obtained by measurement in increments of 100 nm in a wavelength range of 2.5 μm to 25 μm. The measurement is performed at 25° C.

<Base Material>

Further, the far infrared reflective film according to the present disclosure includes a base material.

The base material and the far infrared reflective film may be in contact with each other, or another layer described later may be formed between the base material and the far infrared reflective film.

A base material layer is a layer made of a base material, and the base material is not particularly limited, but it is preferable to use a base material having a high transmittance to infrared rays.

Examples of the base material having a high transmittance to infrared rays include a base material having an average transmittance to infrared rays having a wavelength of 2.5 μm to 25 μm of 50% or more.

As the base material having a high transmittance to infrared rays, examples of inorganic material include silicon, germanium, chalcogenide glass, quartz glass, sapphire, calcium fluoride, barium fluoride, magnesium fluoride, zinc selenide, zinc sulfide, and diamond.

Particularly, it is preferable to use silicon, germanium, chalcogenide glass, quartz glass, or the like, which has a high infrared transmittance and an excellent environmental resistance.

Examples of the base material having a high transmittance to infrared rays include a film formed of, as organic materials, a polyolefin resin such as a polyolefin resin, a cyclic polyolefin resin, poly (4-methylpentene-1), and polybutene-1; a polyester resin such as polyethylene terephthalate and polyethylene naphthalate; a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin, a cellulosic resin such as cellulose acetate, or a laminated film thereof. Among these, a polyolefin resin film and a cyclic polyolefin resin film are preferable. Specific commercially available products can be preferably used, and specific examples thereof include ARTON manufactured by JSR Corporation, ZEONEX manufactured by Zeon Corporation, and TOPAS manufactured by Polyplastics Co., Ltd.

<Other Layers>

The far infrared reflective film according to the present disclosure may include other layers.

Examples of the other layer include a pressure sensitive adhesive layer, a hard coat layer, a back coat layer disclosed in paragraphs 0075 to 0080 of JP2015-129909A. In addition, examples of the other layer include an ultraviolet absorbing layer and an antifouling layer.

<Radio Wave Transmittivity>

The far infrared reflective film according to the present disclosure preferably has a surface resistance value of $1.0 \times 10^8$ Ω/square or more, more preferably $1.0 \times 10^{10}$ Ω/square or more, and still more preferably $1.0 \times 10^{12}$ Ω/square or more, from a viewpoint of radio wave transmittivity.

An upper limit of the surface resistance value is not particularly limited, but is preferably $1.0 \times 10^{50}$ Ω/square or less.

The surface resistance value is measured at a room temperature (23° C.) using a surface resistance measuring device (Loresta, manufactured by Nittoseiko Analytech Co., Ltd.).

<Method of Manufacturing Far Infrared Reflective Film>

The far infrared reflective film according to the present disclosure can be produced, for example, by forming a far infrared reflective layer on a base material by a liquid phase method.

One embodiment includes, for example, a method including a process (coating process) of coating a base material with a coating liquid for forming a far infrared reflective layer, and, as necessary, a process (drying process) of drying the applied coating liquid for forming a far infrared reflective layer.

[Coating Process]

A coating method in the coating process is not particularly limited, and a known method can be used.

Examples of the coating method include a coating method using a spin coater, a dip coater, a die coater, a slit coater, a bar coater, or a gravure coater and a method of performing planar orientation using a method such as an Langmuir-Blodgett (LB) film method, a self-assembly method, and a spray coating.

—Coating Liquid for Forming Far Infrared Reflective Layer—

The coating liquid for forming a far infrared reflective layer preferably includes flat conductive particles and a binder, and may further contain a known solvent, a known additive, and the like.

The flat conductive particles are preferably dispersed in the coating liquid.

Further, the coating liquid for forming a far infrared reflective layer may include a raw material of a binder. Examples of the raw material of the binder include a polymerizable compound and a polymerization initiator, and particularly, in a case where the polymerizable compound and the polymerization initiator are contained, it is possible to form a pattern on the far infrared reflective layer by exposure.

In a case where the coating liquid for forming a far infrared reflective layer includes the raw material of the binder, the method of manufacturing the far infrared reflective layer according to the present disclosure preferably further includes a process of forming a binder.

In the process of forming the binder, for example, a method of curing at least a part of the applied coating liquid for forming a far infrared reflective layer by a known method such as exposure or heating is performed.

[Drying Process]

As a drying method in the drying process, a known drying method is used without particular limitation. Examples thereof include heat drying under normal pressure or reduced pressure, and natural drying. The heating method in heat drying is not particularly limited, and examples thereof include a heating method using a device such as a hot plate and an oven.

<Use>

The far infrared reflective film according to the present disclosure is preferably used for a heat shield material.

That is, the present disclosure includes a heat shield material comprising the far infrared reflective film according to the present disclosure described above.

Examples of the heat shield material include a heat shield film and a heat shield glass described later.

The far infrared reflective film according to the present disclosure has radio wave transmittivity. Therefore, it is considered that, for example, in a case where the far infrared reflective film according to the present disclosure is used as a heat shield material in a window member of a building or a vehicle, there is an advantage that electromagnetic interference is hardly generated in the inside thereof (Heat Shield Film)

The heat shield film according to the present disclosure comprises the far infrared reflective film according to the present disclosure.

In a case where the base material in the far infrared reflective film according to the present disclosure is a film-shaped base material, the far infrared reflective film itself according to the present disclosure may be used as a heat shield film.

In addition, the far infrared reflective film according to the present disclosure may be attached to a film-shaped member to form a heat shield film.

The film-shaped member is not particularly limited, and examples thereof include a film formed of a polyolefin resin such as a polyolefin resin, a cyclic polyolefin resin, poly(4-methylpentene-1), and polybutene-1; a polyester resin such as polyethylene terephthalate and polyethylene naphthalate; a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin, a cellulosic resin such as cellulose acetate, or a laminated film thereof.

(Heat Shield Glass)

The heat shield glass according to the present disclosure comprises the far infrared reflective film according to the present disclosure.

In a case where the base material in the far infrared reflective film according to the present disclosure is a glass, the far infrared reflective film itself according to the present disclosure may be used as a heat shield glass.

In addition, the far infrared reflective film according to the present disclosure or the heat shield film according to the present disclosure described above may be attached to a glass to form a heat shield glass.

The type of the glass is not particularly limited, and a known glass can be used without particular limitation.

The use of the heat shield film or the heat shield glass is not particularly limited, but examples thereof include window members for houses and office buildings, window members for transportation such as automobiles, and the like.

EXAMPLES

Hereinafter, the present disclosure will be described in detail with reference to Examples. The materials, amounts used, ratios, processing contents, processing procedures, and the like shown in the following examples can be appropriately changed without departing from the spirit of the embodiment of the present disclosure. Therefore, the scope of the embodiment of the present disclosure is not limited to the specific examples shown below. In the present example, "parts" and "%" mean "parts by mass" and "% by mass" unless otherwise specified.

Examples 1 to 6 and Comparative Examples 1 to 5

<Evaluation of Far Infrared Reflective Film>
[Manufacture of Far Infrared Reflective Layer]
—Preparation of Flat Conductive Particle Dispersion A1—

13 L of ion exchange water was weighed in a reaction vessel made of NTKR-4 (manufactured by Nippon Metal Industry Co., Ltd.), 1.0 L of a 10 g/L trisodium citrate (anhydride) aqueous solution was added thereto under stirring using a chamber comprising an agitator (stirring means) in which four propellers made of NTKR-4 and four paddles made of NTKR-4 were attached to a shaft made of SUS316L, and the temperature was maintained at 35° C. 0.68 L of a 8.0 g/L polystyrene sulfonic acid aqueous solution was added, and 0.041 L of a sodium borohydride aqueous solution prepared to 23 g/L using a 0.04 mol/L sodium hydroxide aqueous solution was further added. 13 L of a 0.10 g/L silver nitrate aqueous solution was added at 5.0 L/min.

1.0 L of a 10 g/L trisodium citrate (anhydride) aqueous solution and 11 L of ion exchange water were added, and 0.68 L of a 80 g/L potassium hydroquinone sulfonate aqueous solution was further added. The stirring rate was increased to 800 revolutions per minute (rpm), 8.1 L of a 0.10 g/L silver nitrate aqueous solution was added at 0.95 L/min, and then the temperature was lowered to 30° C.

8.0 L of a 44 g/L methylhydroquinone aqueous solution was added, and then the total amount of a gelatin aqueous solution at 40° C. described later was added. The stirring rate was increased to 1,200 rpm, and the total amount of a silver sulfite white precipitate mixed solution described later was added.

In a stage where the pH change of the preparation liquid stopped, 5.0 L of a 1 mol/L NaOH aqueous solution was added at 0.33 L/min. After that, 0.078 L of 70 g/L 1,2-benzisothiazolin-3-one (an aqueous solution was adjusted to be alkaline with NaOH and dissolved) was added. In this manner, a flat conductive particle dispersion A1 was prepared.

—Preparation of Gelatin Aqueous Solution—

16.7 L of ion exchange water was weighed in a dissolution tank made of SUS316L. 1.4 kg of alkali-treated beef bone gelatin (GPC weight-average molecular weight of 200,000) that had been subjected to a deionization treatment was added under low-speed stirring with an agitator made of SUS316L. Further, 0.91 kg of alkali-treated beef bone gelatin (GPC weight average molecular weight of 21,000) that had been subjected to a deionization treatment, a proteolytic enzyme treatment, and an oxidation treatment with hydrogen peroxide was added. After that, the temperature was increased to 40° C., and the gelatin was swollen and dissolved at the same time so as to be completely dissolved.

—Preparation of Silver Sulfite White Precipitate Mixed Solution—

8.2 L of ion exchange water was weighed in a dissolution tank made of SUS316L, and 8.2 L of a 100 g/L silver nitrate aqueous solution was added. 2.7 L of a 140 g/L sodium sulfite aqueous solution was added in a short period of time under high-speed stirring using an agitator made of SUS316L to prepare a mixed solution including the white precipitate of silver sulfite. This mixed solution was prepared immediately before use.

—Preparation of Flat Conductive Particle Dispersion B1—

800 g of the flat conductive particle dispersion A1 described above was collected in a centrifuge tube and adjusted to a pH of 9.2±0.2 at 25° C. using a 1 mol/L sodium hydroxide aqueous solution or a 0.5 mol/L sulfuric acid. After a centrifugation operation at 9,000 rpm for 60 minutes at 35° C. using a centrifuge (himac CR22GIII manufactured by Hitachi Koki Co., Ltd., Angle Rotor R9A), 784 g of the supernatant was discarded. A 0.2 mmol/L NaOH aqueous solution was added to the precipitated flat plate particles to make 400 g in total, and the mixture was manually stirred by a stirring rod to obtain a coarse dispersion. A coarse dispersion for 24 centrifuge tubes was prepared in the same manner as above to make 9,600 g in total, which was added to a tank made of SUS316L and mixed. Further, 10 mL of a 10 g/L solution of Pluronic31R1 (manufactured by BASF SE) (diluted with a mixed solution of methanol:ion exchange water=1:1 (volume ratio)) was added. A batch-type dispersion treatment was performed on the coarse dispersion mixture in the tank at 9,000 rpm for 120 minutes by using an AUTO MIXER Model 20 (a stirring portion is a homomixer MARKII) manufactured by PRIMIX Corporation. A liquid temperature during dispersion was maintained at 50° C. After 800 g of the dispersion obtained in this manner was again collected in a centrifuge tube, and subjected to a centrifugation operation at 9,000 rpm for 60 minutes at 35° C. using a centrifuge (himac CR22GIII manufactured by Hitachi Koki Co., Ltd., Angle Rotor R9A), 760 g of the supernatant was discarded. A 0.2 mmol/L sodium hydroxide aqueous solution was added to the precipitated flat plate particles to make 800 g in total, and the mixture was manually stirred by a stirring rod to obtain a coarse dispersion. A coarse dispersion for 12 centrifuge tubes was prepared in the same manner as above to make 9,600 g in total, which was added to a tank made of SUS316L and mixed. Further, 10 mL of a 10 g/L solution of Pluronic31R1 (manufactured by BASF SE) (diluted with a mixed solution of methanol:ion exchange water=1:1 (volume ratio)) was added. A batch-type dispersion treatment was performed on the coarse dispersion mixture in the tank at 9,000 rpm for 120 minutes by using an AUTO MIXER Model 20 (a stirring portion is a homomixer MARKII) manufactured by PRIMIX Corporation. A liquid temperature during dispersion was maintained at 50° C. After the dispersion, the temperature was lowered to 25° C., and then single-pass filtration was performed using a PROFILE II filter (manufactured by Pall Corporation, a product type of MCY1001Y030H13).

In this manner, the flat conductive particle dispersion A1 was subjected to a desalinization treatment and a redispersion treatment to prepare a flat conductive particle dispersion B1.

Flat metal particle dispersions A2 and B2 and flat metal particle dispersions A3 and B3 were prepared in the same manner as the method of the flat metal particle dispersions A1 and B1, except that reaction conditions were changed so that an average thickness, an average particle diameter, an aspect ratio, and a shape were values described in Table 1.

TABLE 1

|  | Average thickness | Average particle diameter | Aspect ratio | Shape |
| --- | --- | --- | --- | --- |
| A1 (B1) | 8 nm | 120 nm | 15 | Hexagonal flat plate |

TABLE 1-continued

| | Average thickness | Average particle diameter | Aspect ratio | Shape |
|---|---|---|---|---|
| A2 (B2) | 10 nm | 300 nm | 30 | Hexagonal flat plate |
| A3 (B3) | 10 nm | 450 nm | 45 | Hexagonal flat plate |

<Preparation of Coating Liquid C1B for Forming Far Infrared Reflective Layer>

A coating liquid C1B was prepared at a composition ratio of materials shown in Table 2. The numerical values in the table represent parts by mass.

Here, 2.78 L of a 0.1% by mass chloroauric acid (manufactured by Fujifilm Wako Pure Chemical Corporation) aqueous solution was added to 50 L of the coating liquid C1B, and the mixture was stirred at 60° C. for 4 hours to obtain a coating liquid C1B for forming a far infrared reflective layer.

<Preparation of Coating Liquids C2B to C6B for Forming Far Infrared Reflective Layer>

Coating liquids C2B to C6B for forming a far infrared reflective layer were prepared in the same manner as the method of the coating liquid C1B for forming a far infrared reflective layer, except that the composition was changed to the composition ratio of the materials shown in Table 2. The numerical values in Table 2 represent parts by mass.

TABLE 2

| | Coating liquid C1B | Coating liquid C2B | Coating liquid C3B | Coating liquid C4B | Coating liquid C5B | Coating liquid C6B |
|---|---|---|---|---|---|---|
| Polyurethane aqueous solution: HYDRAN HW-350 (manufactured by DIC Corporation, Solid content concentration of 30% by mass) | 0.3 | 0.3 | 0 | 0.6 | 1 | 1 |
| Flat fine particle dispersion B1 | 99.7 | 0 | 0 | 0 | 0 | 0 |
| Flat fine particle dispersion B2 | 0 | 99.7 | 100 | 99.4 | 99.0 | 0 |
| Flat fine particle dispersion B3 | 0 | 0 | 0 | 0 | 0 | 99.0 |

<Production of Far Infrared Reflective Film D1>

A glass base material having a thickness of 0.28 mm and a size of 3 inches was spin-coated with the coating liquid C1B for forming a far infrared reflective layer at a rotation speed of 500 rpm by using a spin coater manufactured by Mikasa Co., Ltd. After that, the coating liquid was heated at 110° C. for 1 minute on a hot plate, dried, and solidified. The above operation was repeated until the film thickness reached 50 nm.

<Production of Far Infrared Reflective Films D2 to D6 and Comparative Films D1 to D5>

Far infrared reflective films D2 to D6 and comparative films D1 to D5 were produced in the same manner as the method of the far infrared reflective film D1, except that the coating liquid for forming a far infrared reflective layer the film thickness of the far infrared reflective layer were changed to those shown in Table 3.

TABLE 3

| Far infrared reflective film | Coating liquid for forming far infrared reflective layer | Aspect ratio | Film thickness (thickness y, nm) | Volume fraction (x) | x × y | 0.183 × 550/k | Expression A |
|---|---|---|---|---|---|---|---|
| D1 | C2B | 30 | 50 | 0.5 | 25 | 30.31 | Satisfied |
| D2 | C3B | 30 | 50 | 0.6 | 30 | 30.31 | Satisfied |
| D3 | C4B | 30 | 50 | 0.4 | 20 | 30.31 | Satisfied |
| D4 | C2B | 30 | 40 | 0.5 | 20 | 30.31 | Satisfied |
| D5 | C2B | 30 | 30 | 0.5 | 12.5 | 30.31 | Satisfied |
| D6 | C6B | 45 | 50 | 0.5 | 25 | 30.31 | Satisfied |
| Comparative film D1 | C1B | 15 | 50 | 0.5 | 25 | 30.31 | Satisfied |
| Comparative film D2 | C1B | 15 | 240 | 0.5 | 120 | 30.31 | Not satisfied |
| Comparative film D3 | C2B | 30 | 100 | 0.5 | 50 | 30.31 | Not satisfied |
| Comparative film D4 | C5B | 30 | 50 | 0.3 | 15 | 30.31 | Satisfied |
| Comparative film D5 | C2B | 30 | 20 | 0.5 | 10 | 30.31 | Satisfied |

In Table 3, the column of "aspect ratio" indicates the aspect ratio of the flat conductive particles included in the used coating liquid for forming a far infrared reflective layer, the column of "film thickness" indicates the film thickness of the formed far infrared reflective layer, the column of "volume fraction" indicates the content (volume fraction) of the flat conductive particles in the formed far infrared reflective layer, the column of "x×y" indicates the value of x×y, the column of "0.183×550/k" indicates the value of 0.183×550/k, and the column of Expression A indicates whether or not Expression A is satisfied.

<Evaluation>

[Evaluation of Far Infrared Reflectance]

An infrared reflectance R (%) at front incidence was measured using a Fourier transform infrared spectrophotometer VIR-100 manufactured by JASCO Corporation.

A reflectance from a wavelength of 2.5 μm to a wavelength of 25 μm was measured in increments of 20 nm, and an arithmetic average value of the measured values was taken as a far infrared reflectance. A measurement result in each Example or Comparative Example is shown in Table 4.

Figure 4:
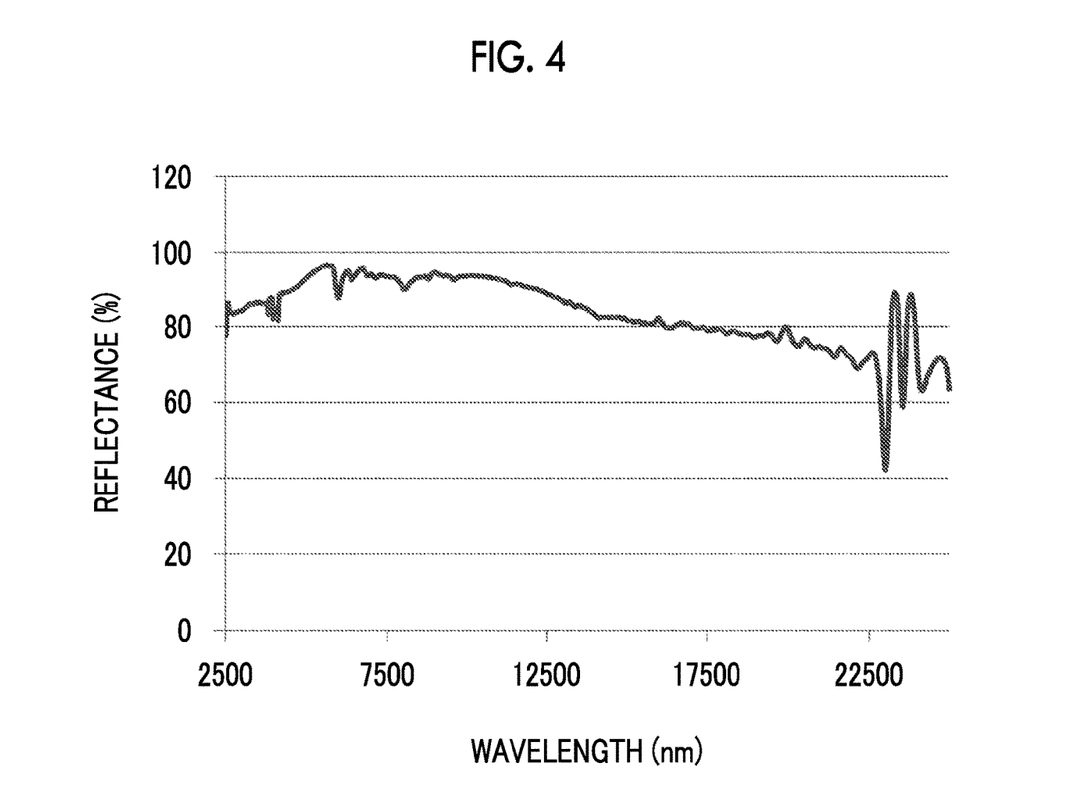
FIG. 4 is a graph showing measurement results of a far infrared reflectance of a far infrared reflective film D1.

As an example of the measurement result, a measurement result of a far infrared reflectance of Example 1 (far infrared reflective film D1) is shown in FIG. 4. The vertical axis of FIG. 4 is a reflectance (%), and the horizontal axis is a wavelength (nm).

It can be seen from FIG. 4 that the far infrared reflective film D1 according to Example 1 can reflect far infrared rays in a wide range of a wavelength of 2.5 μm to a wavelength of 25 μm.

[Evaluation of Visible Light Transmittivity]

A transmittance at a wavelength of 550 nm at front incidence was measured using a spectrophotometer U4000 manufactured by Hitachi High-Tech Corporation.

In a case where a transmittance was 10% or more, it was evaluated as having transmittivity (A), and in a case where a transmittance was less than 10%, it was evaluated as having no transmittivity (B). An evaluation result in each Example or Comparative Example is shown in Table 4.

[Evaluation of Radio Wave Transmittivity]

A surface resistance (Ω/square) of the far infrared reflective film in each Example or Comparative Example was measured using a surface resistance measuring device (Loresta, manufactured by Nittoseiko Analytech Co., Ltd.) to obtain radio wave transmittivity. It can be said that the larger the surface resistance value is, the more the radio wave transmittivity is excellent. A measurement result in each Example or Comparative Example is shown in Table 4.

TABLE 4

| | Far infrared reflective film | Far infrared reflectance (%) | Visible light transmittivity | Radio wave transmittivity (surface resistance value, Ω/square) |
|---|---|---|---|---|
| Example 1 | D1 | 83 | A | $9.9 \times 10^{12}$ |
| Example 2 | D2 | 86 | A | $9.9 \times 10^{12}$ |
| Example 3 | D3 | 78 | A | $9.9 \times 10^{12}$ |
| Example 4 | D4 | 64 | A | $9.9 \times 10^{12}$ |
| Example 5 | D5 | 45 | A | $9.9 \times 10^{12}$ |
| Example 6 | D6 | 90 | A | $9.9 \times 10^{12}$ |
| Comparative Example 1 | Comparative film D1 | 25 | A | $9.9 \times 10^{12}$ |
| Comparative Example 2 | Comparative film D2 | 32 | B | $9.9 \times 10^{12}$ |
| Comparative Example 3 | Comparative film D3 | 86 | B | $9.9 \times 10^{12}$ |
| Comparative Example 4 | Comparative film D4 | 28 | A | $9.9 \times 10^{12}$ |
| Comparative Example 5 | Comparative film D5 | 24 | A | $9.9 \times 10^{12}$ |

As described above, it was confirmed that any of the far infrared reflective films D1 to D6 can reflect far infrared rays in a wide wavelength range and have excellent visible light transmittivity and excellent radio wave transmittivity.

In addition, the far infrared reflective films D1 to D6 had visible light transmittivity.

As described above in Examples, according to the present disclosure, it was confirmed that a far infrared reflective film that is capable of reflecting far infrared rays in a wide wavelength range and having excellent visible light transmittivity and excellent radio wave transmittivity can be obtained.

EXPLANATION OF REFERENCES

10: base material
12: far infrared reflective layer
20, 21, 22: flat conductive particle
30: far infrared reflective film
D: particle diameter (equivalent circle diameter)
T: thickness of flat conductive particle The disclosure of JP2018-076712 filed on Apr. 12, 2018 is incorporated herein by reference in its entirety.

All documents, patent applications, and technical standards described in the present specification are herein incorporated by reference to the same extent that each individual document, patent application, or technical standard was specifically and individually indicated to be incorporated by reference.

What is claimed is:

1. A far infrared reflective film comprising:
a base material; and
a far infrared reflective layer including a binder and flat conductive particles,
wherein a value obtained by dividing an average particle diameter of the flat conductive particles by an average thickness of the flat conductive particles is 20 or more,
a thickness y nm of the far infrared reflective layer is 3 times or more the average thickness of the flat conductive particles,
a volume fraction x of the flat conductive particles in the far infrared reflective layer is 0.4 or more, and
a product x×y of the volume fraction x and the thickness y satisfies Expression A, $$x \times y \leq 0.183 \times \frac{\lambda}{k} \quad \text{Expression A}$$

in Expression A, λ is 550 nm, and k represents an extinction coefficient of a material constituting the flat conductive particles at a wavelength of 550 nm.

2. The far infrared reflective film according to claim 1, wherein the flat conductive particle is a flat metal particle.

3. The far infrared reflective film according to claim 2, wherein the flat metal particle includes at least silver.

4. The far infrared reflective film according to claim 1, wherein a principal plane of the flat conductive particle has a hexagonal or more polygonal shape or a circular shape.

5. The far infrared reflective film according to claim 1, wherein a principal plane of the flat conductive particle is planarly oriented in a range of 0° to 30° with respect to a surface of the base material.

6. The far infrared reflective film according to claim 1, wherein the flat conductive particles are randomly arranged in a surface direction of the far infrared reflective layer.

7. The far infrared reflective film according to claim 1, wherein the binder includes a polymer.

8. The far infrared reflective film according to claim 1, wherein the far infrared reflective film is used for a heat shield material.

9. A heat shield film comprising:
the far infrared reflective film according to claim 1.

10. A heat shield glass comprising:
the far infrared reflective film according to claim 1.

* * * * *